Feb. 4, 1958     H. N. OLIVER     2,821,874
BORING BAR
Filed Sept. 22, 1955
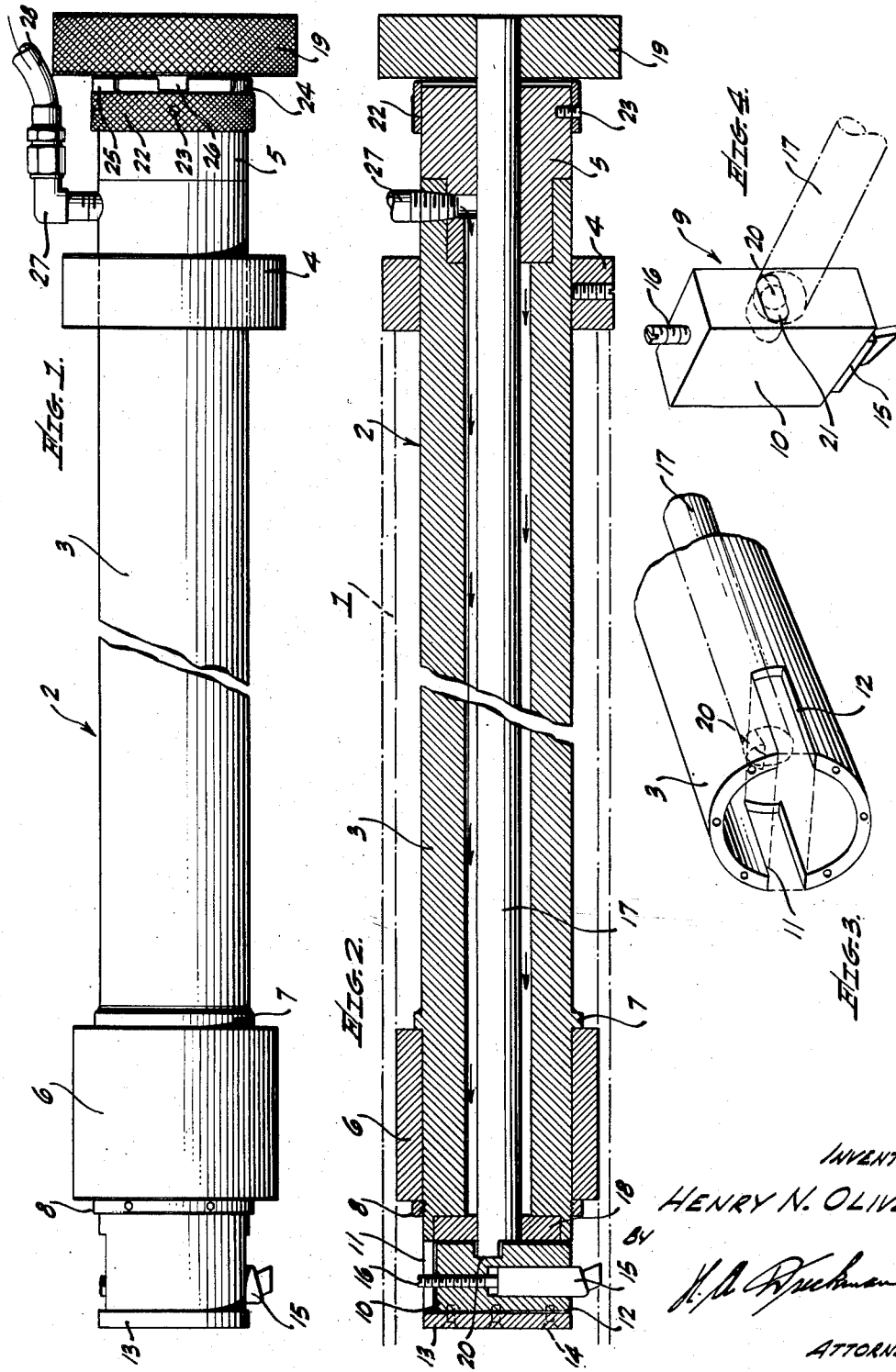
INVENTOR.
HENRY N. OLIVER,
BY
ATTORNEY.

United States Patent Office 2,821,874
Patented Feb. 4, 1958

2,821,874

BORING BAR

Henry N. Oliver, Huntington Park, Calif.

Application September 22, 1955, Serial No. 535,817

2 Claims. (Cl. 77—58)

This invention relates to a boring bar which is used in the boring of tubular parts, such as cylinders, hydraulic cylinders, gun barrels, and other tubular structures, and especially to cut annular grooves or recesses in the tubular parts.

An object of my invention is to provide a novel boring bar which is provided with an effective means of supporting the bar adjacent the cutting tool, and also to effectively advance that cutting tool into the work as may be necessary to cut a groove or recess.

Another object of my invention is to provide a novel means of advancing the cutter into the work as required and to provide a means whereby the amount of advancement of the cutter may be readily determined from outside of the tubular member.

Still another object of my invention is to provide a novel assembly of parts whereby the boring bar may be readily assembled and constructed in an effective and inexpensive manner.

Other objects, advantages and features of invention may appear from the accompanying drawing, the subjoined detailed description and the appended claims.

In the drawing—

Figure 1 is a side elevation of my boring bar.

Figure 2 is a longitudinal sectional view of the same.

Figure 3 is a perspective view of one end of the housing.

Figure 4 is a perspective view of the tool mount and the means of advancing the mount.

In usual practice the boring bar is mounted in the tail stock of a lathe and is then moved into the tubular member which is to be bored, the tubular member being chucked in the lathe and held in proper alignment with the boring bar. The tubular member 1 which is to be bored is open at the end so as to receive the boring bar 2. The boring bar 2 consists of a tubular housing 3 of suitable length which is preferably held in the chuck of a lathe. The lathe chuck engages a ring 4, movably mounted on the housing 3, that is, the ring 4 can be adjusted longitudinally along the housing as might be required so that the boring bar is inserted a proper distance into the tube 1 which is to be bored or grooved. The ring 4 may also act as a stop for the boring bar so as to accurately position the cutter. The housing 3 has a substantial wall thickness. A block 5 is fitted into one end of the housing 3 and this block also serves as a bearing for the adjusting shaft, which will be subsequently described. At the opposite end of the housing 3 from the block 5 I provide a sleeve 6 which closely fits within the tubular member 1 which is to be worked upon. The sleeve 6 bears against a shoulder 7 formed on the outside of the housing 3 and a ring 8 threads onto the housing 3 and bears against the other end of the sleeve 6, thus holding the sleeve in position on the housing 3. The sleeve 6 is thus journaled on the housing 3 and may rotate thereon as required.

At the end of the housing 3 adjacent the sleeve 6 I provide a cutter mount 9 which consists of a rectangular block 10 which fits in the slots 11—12 formed in the end of the housing 3. The block 10 is held in position by an end plate 13 which is attached to the end of the housing 3 by means of suitable machine screws 14 or the like. A cutter 15 is mounted in the block 10 and may be adjusted radially by means of the adjusting screw 16 which is threaded in the block 10. The cutter block 10 is adjusted radially to advance the cutter 15 by means of a shaft 17 which extends longitudinally through the housing 3. The shaft 17 is supported at one end by the bearing 18 and at the other end by the block 5 which acts as a bearing. A disc or handle 19 is attached to the protruding end of the shaft 17 for the purpose of rotating the shaft and advancing the cutter block 10. An eccentric pin 20 fits into a slot 21 in the block 10 and thus on rotation of the shaft 17 the block will be moved radially to advance the cutter 15 into the work.

In order that the cutter 15 may be advanced a known amount I provide an adjustable stop for the wheel 19, consisting of a sleeve 22 which is rotatably mounted on the housing 3 and is held in position by set screws 23. Spaced stops 24—25 are provided on the sleeve 22. A finger 26 protrudes from the wheel 19 between the stops 24 and 25, thus limiting the rotation of the wheel 19 and, therefore, determining the amount of advance or retraction of the cutter 15. Since the sleeve 22 can be adjusted relative to the wheel 19 it is possible to accurately determine the amount of advance of the cutter 15 and thus the depth of the cut which it makes. Cutter fluid is circulated through the boring bar and through the housing 3 by means of the fitting 27 which screws into one end of the housing 3 and opens into the bore of that housing. A hose 28, attached to the fitting, conveys the cutter fluid to the boring bar. The cutter fluid flows longitudinally through the housing 3 and thence around the outer end of the shaft 17 and around the block 10 and pours outwardly onto the cutter 15 for the purpose of cooling the cutter and also carrying the metal shavings away.

In operation the inside diameter of the tubular member 1 which is to be bored or grooved is known and a proper sleeve 6 is mounted on the housing 3 to accurately fit this bore. The cutter 15 is now adjusted so that it will just clear the inside surface of the tubular member 1. The sleeve 22 is now rotated until the one stop 25 just engages the finger 26. The boring bar is now inserted in the pipe 1 which is to be grooved and the pipe is then rotated while the cutter 15 is fed outwardly by slow rotation of the wheel 19 until the stop 24 is engaged, which indicates the maximum depth of the cut which is to be made on the inside of the tube or pipe 1.

My boring bar will effectively cut a groove or recess within the tubular member which is concentric with the internal surface of the tubular member. The reason for this accurate cutting of the groove is the manner of supporting the boring bar by the sleeve 6, and also the method of advancing the cutter 15 from the outer end of the boring bar and, further, the adjustability of the boring bar in its mount within the tubular member so that any eccentricity of the outer surface does not effect the accuracy of the cut on the inside of the tubular member.

Having described my invention, I claim:

1. A boring bar comprising a tubular housing, a sleeve, means removably mounting said sleeve adjacent one end of the housing, a cutter block, means slidably mounting said cutter block at one end of said housing for transverse movement in the housing, a cutter in said block, a hand wheel positioned on the housing at the end opposite said cutter block, and a shaft extending from the hand wheel through said housing and engaging the cutter block to adjust said cutter block on rotation of the hand wheel, a second sleeve on the housing adjacent the hand wheel, means mounting the second sleeve for rotatable adjustment relative to the housing, a stop on the second sleeve, and a finger on the hand wheel engageable with said stop to limit rotation of the hand wheel.

2. A boring bar comprising a tubular housing, a sleeve, means removably mounting said sleeve adjacent one end of the housing, a rectangular cutter block slidably mounted at one end of said housing for transverse movement in the housing, said housing having slots formed therein through which the cutter block extends in its transverse movement, an end plate on the housing to hold said cutter block in position within the housing, a cutter in said block, means slidably mounting the cutter in the block, a hand wheel positioned on the housing at the end opposite said cutter block, and a shaft extending from the hand wheel through said housing and engaging the cutter block to adjust said cutter block on rotation of the hand wheel, a second sleeve on the housing adjacent the hand wheel, means mounting the second sleeve for rotatable adjustment relative to the housing, a stop on the second sleeve, and a finger on the hand wheel engageable with said stop to limit rotation of the hand wheel.

References Cited in the file of this patent

UNITED STATES PATENTS

| 31,799 | Graham | Mar. 26, 1861 |
| 1,225,745 | Barnes | May 15, 1917 |
| 1,424,489 | Kriesel | Aug. 1, 1922 |
| 2,046,386 | Kettl | July 7, 1936 |

FOREIGN PATENTS

| 102,911 | Great Britain | Jan. 4, 1917 |

OTHER REFERENCES

"American Machinists," May 29, 1924.